United States Patent
Terashima et al.

(10) Patent No.: US 11,763,417 B2
(45) Date of Patent: Sep. 19, 2023

(54) SEMICONDUCTOR DEVICE AND IMAGE PROCESSING SYSTEM FOR PROCESSING REGIONS OF INTEREST IMAGES

(71) Applicant: RENESAS ELECTRONICS CORPORATION, Tokyo (JP)

(72) Inventors: Kazuaki Terashima, Tokyo (JP); Isao Nagayoshi, Tokyo (JP); Atsushi Nakamura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/531,302

(22) Filed: Nov. 19, 2021

(65) Prior Publication Data

US 2023/0162315 A1 May 25, 2023

(51) Int. Cl.
*G06T 1/20* (2006.01)
*G06T 1/00* (2006.01)
*G06T 3/40* (2006.01)
*G06T 7/11* (2017.01)

(52) U.S. Cl.
CPC .............. *G06T 1/20* (2013.01); *G06T 1/0007* (2013.01); *G06T 3/4015* (2013.01); *G06T 7/11* (2017.01)

(58) Field of Classification Search
None
See application file for complete search history.

(56) References Cited

U.S. PATENT DOCUMENTS

| | | | |
|---|---|---|---|
| 2015/0016747 A1* | 1/2015 | Huang | G06T 11/60 382/282 |
| 2019/0026568 A1* | 1/2019 | Kario | G05D 1/0246 |
| 2019/0204448 A1* | 7/2019 | Eki | H04N 5/225 |
| 2021/0046870 A1* | 2/2021 | Maekawa | B60R 1/00 |
| 2021/0152732 A1* | 5/2021 | Eki | H04N 13/239 |
| 2021/0192231 A1* | 6/2021 | Lee | G06V 20/58 |
| 2021/0201049 A1* | 7/2021 | Su | G06V 30/2504 |

FOREIGN PATENT DOCUMENTS

JP 2004-140613 A 5/2004

* cited by examiner

*Primary Examiner* — Patrick F Valdez
(74) *Attorney, Agent, or Firm* — McDermott Will & Emery LLP (57) ABSTRACT

The semiconductor device includes an image signal processor, a scaler, and an ROI (Region of Interest) controller. The image signal processor executes image processing including demosaic processing and stores the image after the image processing in memory. The scaler reduces the capture image from the image sensor to generate a reduced entire image and causes the image signal processor to execute image processing on the reduced entire image. The ROI controller cuts out a partial region of the captured image from the image sensor to generate an ROI image and causes the image signal processor to execute image processing on the ROI image.

10 Claims, 9 Drawing Sheets

SEMICONDUCTOR DEVICE AND IMAGE PROCESSING SYSTEM FOR PROCESSING REGIONS OF INTEREST IMAGES

BACKGROUND

The present invention relates to a semiconductor device and an image processing system including the semiconductor device.

Conventionally, an image processing apparatus descried in Japanese unexamined Patent Application publication No. 2004-140613 (Patent Document 1) has be known. Patent Document 1 discloses an image processing apparatus for realizing high-quality image display and the like. Specifically, the image processing apparatus obtains an image to be displayed and an image to be encoded without deteriorating quality from the captured image by reducing the captured image to the image size required by the display means and the image coding means, respectively.

SUMMARY

For example, in the automotive field, ADAS (Advanced Driver Assistance Systems) is being mounted. In ADAS, various processes are executed on the captured images by the camera. In recent years, the sizes of captured images have increased drastically from 2M[px] to 8M[px] and 16M[px]. Increasing the size of the captured image is expected to improve the accuracy of image recognition.

On the other hand, as the size of the captured image increases, the required bandwidth of the memory also increases. However, it is usually not easy to significantly increase the memory bandwidth. In this case, for example, it may be difficult to satisfy a required processing speed or the like. Therefore, a mechanism for realizing high-accuracy image recognition while reducing the size of the image data stored in the memory has been awaited.

Other objects and novel features will become apparent from the description of this specification and the accompanying drawings.

Accordingly, the semiconductor device according to one aspect includes an image signal processor, a scaler, and an ROI (Region of Interest) controller. The image signal processor executes image processing including demosaic processing and stores the image after the image processing in memory. The scaler reduces the capture image from the image sensor to generate a reduced entire image. The ROI controller cuts out a partial region of the captured image from the image sensor to generate an ROI image. The image signal processor executes the image processing on the reduced entire image and the ROI image, respectively.

By using the semiconductor device of one aspect, high-accuracy image recognition can be realized while reducing the size of image data stored in the memory.

DETAILED DESCRIPTION

In the following embodiments, when required for convenience, the description will be made by dividing into a plurality of sections or embodiments, but except when specifically stated, they are not independent of each other, and one is related to the modified example, detail, supplementary description, or the like of part or all of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle. Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

Hereinafter, embodiments will be described in detail based on the drawings. In all the drawings for explaining the embodiments, members having the same functions are denoted by the same reference numerals, and repetitive descriptions thereof are omitted. In the following embodiments, descriptions of the same or similar parts will not be repeated in principle except when particularly necessary.

First Embodiment

<Schematic of Image Processing System>

Figure 1:
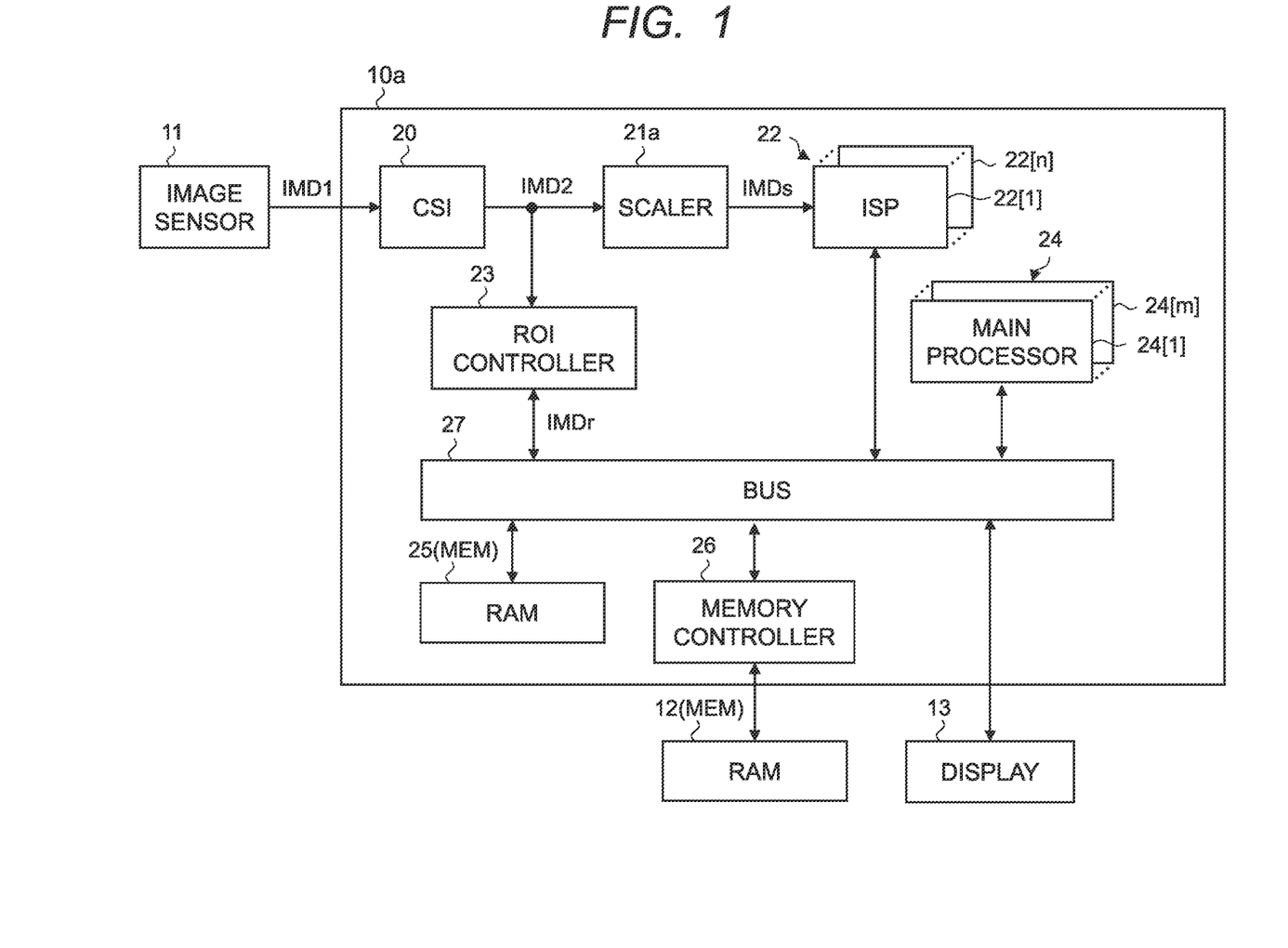
FIG. 1 is a schematic diagram showing a configuration example of an image processing system according to first embodiment.

FIG. 1 is a schematic diagram showing a configuration example of an image processing system according to first embodiment. The image processing system is, for example, an in-vehicle system or the like. The image processing system includes an image sensor 11, a semiconductor device 10*a*, a RAM (random access memory) 12, and a display 13. The image sensor 11 includes image pickup elements of CMOS (Complementary Metal Oxide Semiconductor) type or CCD (Charge Coupled Device) type arranged in a matrix, in other words, pixels. The image sensor 11 captures an object and generates an image data IMD1 representing the captured image.

RAM 12 is, for example, DRAM (Dynamic RAM). The display 13 is, for example, a liquid crystal display, or an organic EL (Electro Luminescence) display or the like. The semiconductor device 10a is, for example, an in-vehicle SoC (System on a Chip) or the like configured by one semiconductor chip.

The semiconductor device 10a executes image processing and image recognition processing on the captured image from the image sensor 11. The semiconductor device 10a displays an image on the display 13 as necessary. The semiconductor device 10a includes a CSI (Camera Serial Interface) 20, a scaler 21a, an ISP (image signal processor) 22, an ROI (Region Of Interest) controller 23, a main processor 24, a RAM 25, a memory controller 26, and a bus 27.

The bus 27 interconnects the image signal processor 22, the ROI controller 23, the main processor 24, the RAM 25, and the memory controller 26. The RAM 25 includes, for example, DRAM and SRAM (Static RAM). The memory controller 26 controls access to an external RAM 12 via the bus 27. The difference between RAM 12 and RAM 25 is either external memory or internal memory. In the specification, if there is no particular need to distinguish them, RAMs 12,25 are collectively referred to as memory MEMs.

The CSI 20 is, for example, a circuit having various functions based on MIPI CSI-2 specifications and the like. The CSI 20 receives the captured image from the image sensor 11, that is, the image data IMD1. The image data IMD1 is, for example, differential serial data including pixel values of respective pixels based on a Bayer arrangement. The CSI 20 mainly converts the image data IMD1, which is the differential serial data, in parallel and outputs the image data IMD2, which is the single parallel data. The image data IMD1, IMD2 is generally referred to as RAW data.

The scaler (first scaler) 21a reduces the image data IMD2 from the CSI 20, that is, the captured image from the image sensor 11 and generates image data IMDs. In other words, the image data IMDs correspond to a reduced image of entire captured image and is hereinafter also referred to as the reduced entire image. Specifically, the scaler 21a includes a circuit which appropriately calculates R (red), G (green), B (blue) pixel value in each pixel after reduction based on, for example, the pixel value of each pixel based on the Bayer arrangement. The scaler 21a causes the image signal processor 22 to execute image processing on the generated image data IMDs, that is, the reduced entire image.

The image signal processor 22 receives the image data IMDs from the scaler 21a, that is, the reduced entire image, or the image from the bus 27. The image signal processor 22 executes a program stored in a RAM 25 or the like, to execute a predetermined image processing on the input image. The image signal processor 22 stores the image after the image processing in the memory MEM. The image processing of the image signal processor 22 includes demosaic processing, white balance processing, correction processing of distortion aberration of the lens, and the like.

The demosaic processing is a process of interpolating pixel values of colors that are missing due to Bayer arrangement, or the like based on surrounding pixel values. The white balance processing is a processing for correcting pixel values of R (red), G (green), and B (blue) with reference to white. In detail, the image signal processor 22 includes a plurality of (n) image signal processors 22[1] to 22[n]. Each of the image signal processors 22[1] to 22[n] is capable of independently executing image processing. Each of the image signal processors 22[1] to 22[n] may be a processor core.

The ROI controller 23 generates an ROI image by cutting out a partial region of the image data IMD2 from the CSI 20, that is, the captured image from the image sensor 11. The ROI controller 23 stores the image data IMDr representing the ROI image in the memory MEM, and the image signal processor 22 executes the image processing on the ROI image. Note that ROI is a function to cut out the important partial region of the entire image with high image quality, and also a function to improve the efficiency of recording, etc., by lowering the image quality of the non-important regions. More specifically, the ROI controller 23 includes a circuit that cuts out a partial region of the image data IMD2 from CSI 20 as it is.

The main processor 24 includes, for example, a CPU (Central Processing Unit) with a GPU (Graphics Processing Unit), a DSP (Digital Signal Processor), or the like. The main processor 24 executes a program stored in a RAM 25 or the like to execute a predetermined processing.

As one of the processes, the main processor 24 executes image recognition processing (first image recognition processing) on the reduced entire image after the image processing by the image signal processor 22 has been executed. In the present specification, image processing by the image signal processor 22 is referred to as ISP processing. In particular, the image signal processor 22 executes ISP processing on the reduced entire image from the scaler 21a and stores the reduced entire image after ISP processing in the memory MEM. The main processor 24 executes image recognition processing on the reduced entire image stored in the memory MEM.

As another process, the main processor 24 executes image recognition processing (second image recognition processing) on the ROI image after the ISP processing by the image signal processor 22 has been executed. In particular, the image signal processor 22 executes the ISP processing on the ROI image stored in the memory MEM by the ROI controller 23, and then stores the ROI image after the ISP processing in the memory MEM. The main processor 24 executes image recognition processing on the ROI image after the ISP processing stored in the memory MEM.

Further, as another process, the main processor 24 executes image processing for displaying a predetermined image on the display 13 via the bus 27. In detail, the main processor 24 includes a plurality of (n) main processors 24[1] to 24 [m]. Each of the main processors 24 [1] to 24 [m] may independently execute various processes including image recognition processing. Each of the main processors 24[1] to 24[m] may be a processor core.

<Schematic of Image Processing System>

Figure 2:
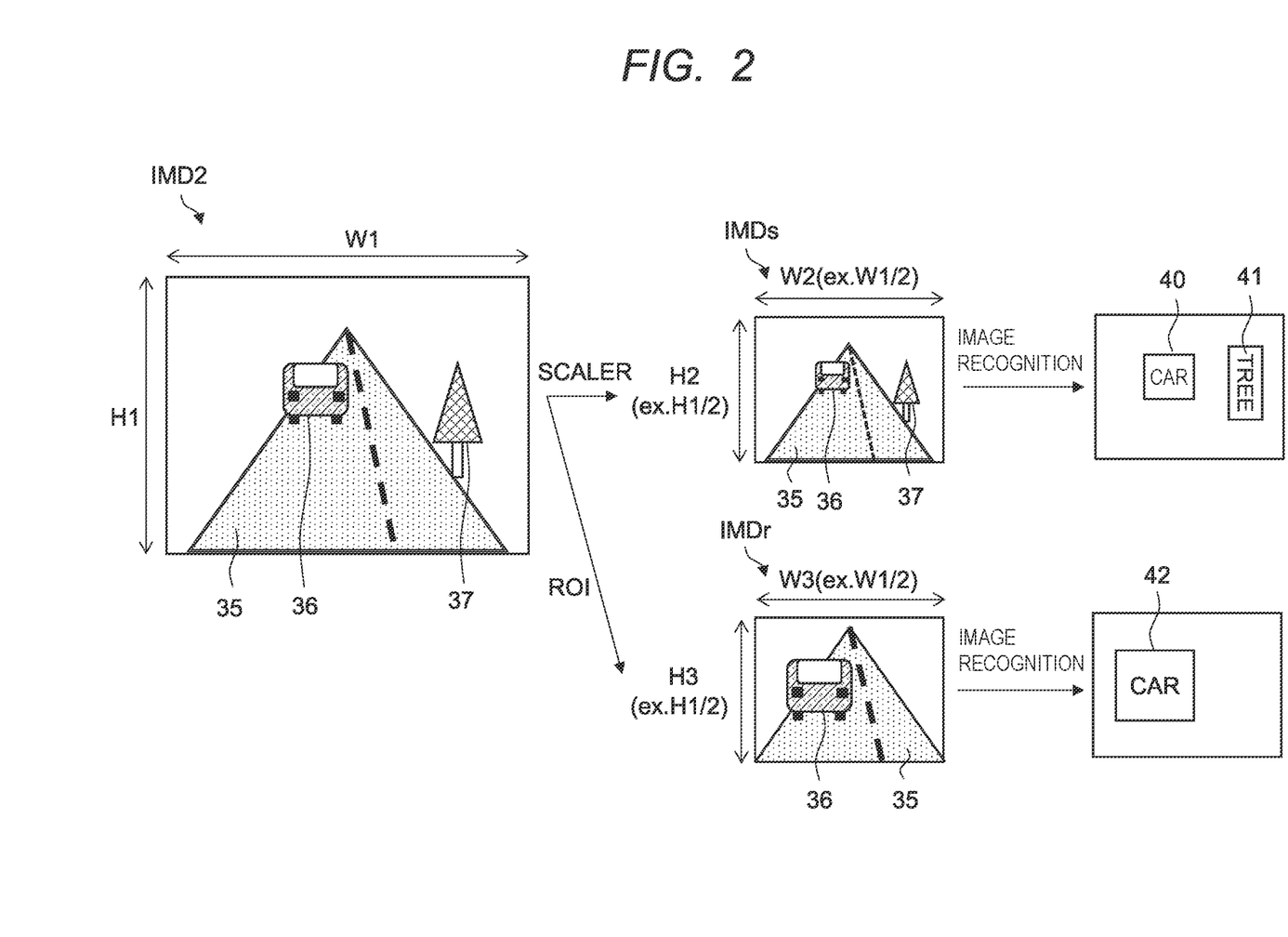
FIG. 2 is a schematic diagram illustrating an example of a schematic operation of a main part of the image processing system of FIG. 1.

FIG. 2 is a schematic diagram illustrating an example of a schematic operation of a main part of the image processing system of FIG. 1. In FIG. 2, the captured image from the image sensor 11 represented by the image data IMD2 has a vertical size of H1[px] and a horizontal size of W1[px]. The captured image includes, for example, a road 35, a vehicle 36 existing on the road 35, and a tree 37 existing beside the road.

The scaler 21a reduces the vertical size H1[px] and the horizontal size W1[px] of the captured image to ½ or the like, respectively, thereby generating the image data IMDs, that is, a reduced entire image. In the reduced entire image, the vertical size H2[px] is ½ of H1, and the horizontal size W2[px] is ½ of W1. As a result, the size of the reduced entire image is ¼ of that of the captured image.

On the other hand, the ROI controller 23 cuts out a partial region, for example, located at the upper center of the captured image and generates an image data IMDr, that is, an ROI image (also referred to as an ROI equal-magnification image). In this case, in the ROI image, the vertical size H3 is ½ of H1 and the horizontal size W3 is ½ of W1. As a result, the size of the ROI image is ¼ of that of the captured image. The ROI image does not include the image of the tree 37 as the region is cut out.

The main processor 24 executes image recognition processing on the reduced entire image represented by the image data IMDs, and in particular, on the reduced entire image after ISP processing by the image signal processor 22. Specifically, the main processor 24 recognizes the position and type of objects included in the reduced entire image by image recognition processing. In this example, the object 40 corresponding to the vehicle 36 and the object 41 corresponding to the tree 37 are recognized.

However, the resolution of the reduced entire image is, for example, ¼ of that of the original captured image. Thus, the processing load associated with image recognition processing can be reduced, while the accuracy of image recognition can be relatively low. As a result, particularly when the objects 40 and 41 are located in far place on the road 35, in other words, when the image data size of the objects 40 and 41 becomes smaller, the types and positions of the objects 40 and 41 may not be obtained with sufficient accuracy.

Therefore, the main processor 24 executes the same image recognition processing on the ROI image represented by the image data IMDr, and in particular, on the ROI equal-magnification image after the ISP processing by the image signal processor 22. At this time, the resolution of the ROI equal-magnification image is the same as that of the original captured image. The size of the ROI equal-magnification image is, for example, ¼ of the original captured image. For this reason, it is possible to relatively improve the accuracy of image recognition while suppressing an increase in processing load by image recognition processing. As a result, the type and the position of the object 42 corresponding to the vehicle 36 can be obtained with sufficient accuracy, particularly even if the object 42 is located in far place on the road 35.

<Detailed Operation of Image Processing System>

Figure 3:
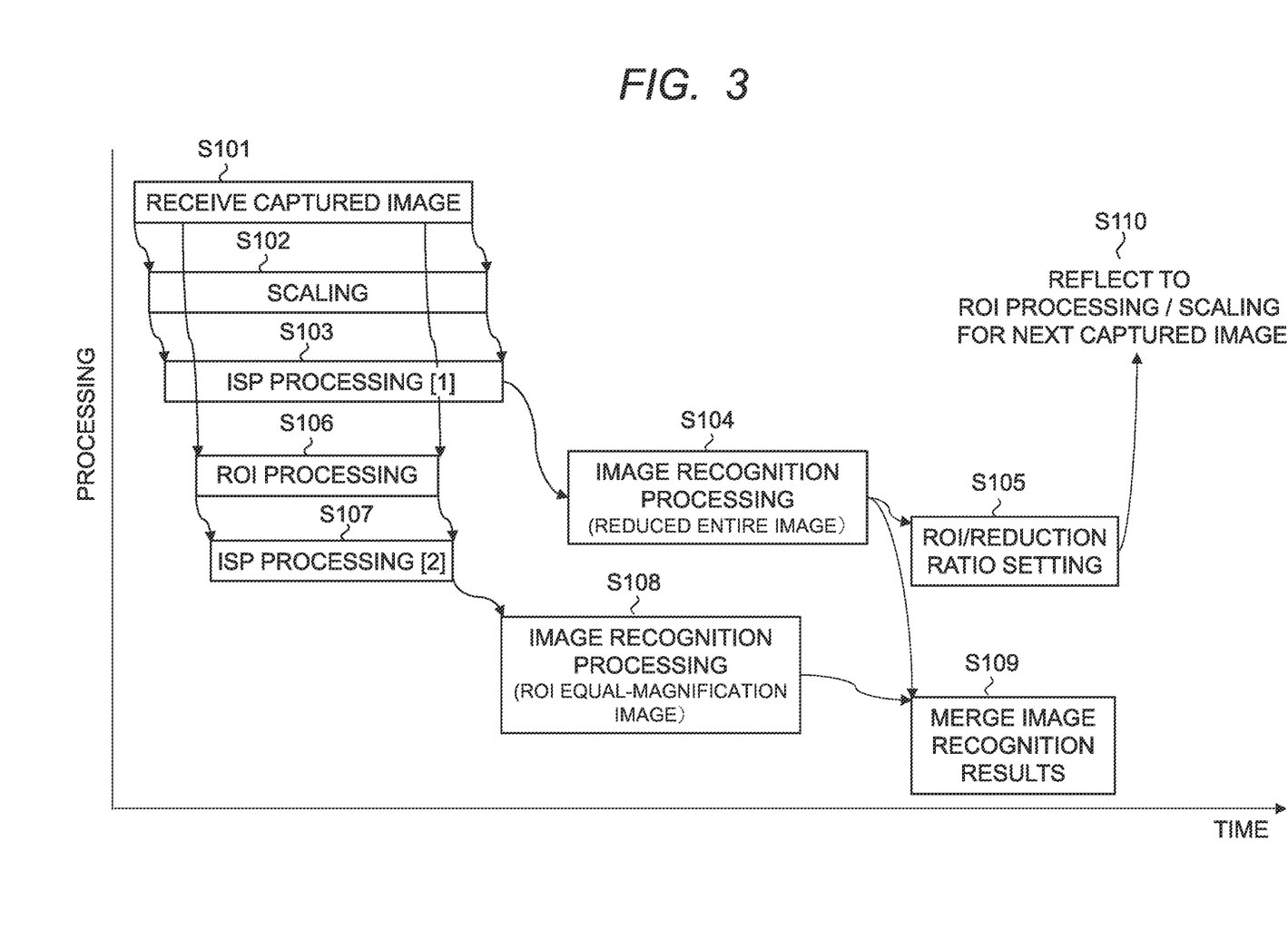
FIG. 3 is a timing chart showing an operation example of a main part of the image processing system of FIG. 1.

FIG. 3 is a timing chart showing an operation example of a main part of the image processing system of FIG. 1. In FIG. 3, the CSI 20 receives the captured image from the image sensor 11, that is, the image data IMD1 (step S101). Next, the scaler 21a reduces the image data IMD2 from the CSI 20, that is, the captured image from the image sensor 11, thereby generating the image data IMDs, that is, the reduced entire image in step S102.

Next, one of the image signal processors 22, for example, the first image signal processor 22[1], executes ISP processing on the reduced entire image generated in step S102 (step S103). Then, the first image signal processor 22[1] stores the reduced entire image after the ISP processing in the memory MEM.

In step S106, the ROI controller 23 cuts out a partial region from the image data IMD2 from the CSI 20, that is, the captured image from the image sensor 11 in parallel with the process of the scaler 21a in step S102, thereby generating an ROI equal-magnification image. In this embodiment, around the middle of the period in which the captured image is acquired in the step S101, the partial region of the captured image is cut out. The ROI controller 23 stores the generated ROI equal-magnification image in the memory MEM.

Subsequently, one other of the image signal processors 22, e.g., the second image signal processor 22[2], executes ISP processing on the ROI equal-magnification image stored in the memory MEM at step S106 (step S107). The second image signal processor 22[2] stores the ROI equal-magnification image after the ISP processing in the memory MEM. The ISP processing by the second image signal processor 22[2] in the step S107 is executed in parallel with the ISP processing by the first image signal processor 22[1] in the step S103.

After the ISP processing at the step S103 is executed, one of the main processors 24, for example, the first main processor 24[1] executes image recognition processing (first image recognition processing) on the reduced entire image stored in the memory MEM at the step S103 (step S104). Further, after the ISP processing in the step S107 is executed, one other of the main processor 24, for example, the second main processor 24[2] executes the image recognition processing (second image recognition processing) on the ROI equal-magnification image stored in the memory MEM at the step S107 (step S108). The image recognition processing by the second main processor 24[2] at the step S108 is executed in parallel with the image recognition processing by the first main processor 24[1] at the step S104.

After the image recognition processing is executed at the steps S104 and S108, the main processor 24 merges the result of the image recognition processing executed on the reduced entire image with the result of the image recognition processing executed on the ROI equal-magnification image (step S109). Specifically, the main processor 24 generates, for example, an object list indicating the type(s) and position(s) of object(s) included in the entire captured image. At this time, the type(s) and position(s) of the object(s) are shown in detail in the portion of the ROI equal-magnification image, and are shown roughly in the portion except for the ROI equal-magnification image. The main processor 24 which executes the process in the step S109 may be the first or second main processor 24[1], 24[2], or another third main processor 24[3].

Here, the partial region used in the ROI processing in the step S106, in other words, the cut-out region may be fixed or dynamically determined. The reduction ratio used in the reduction processing in the step S102 may also be fixed or dynamically determined. When the cut-out region or the reduction ratio is dynamically determined, the process in step S105 is executed.

In the step S105, the main processor 24 sets the cut-out region used by the ROI controller 23 or sets the reduction ratio used by the scaler 21a based on the result of executing the image recognition on the reduced entire image at the step S104. For example, in the case where the object can be sufficiently recognized even in the reduced entire image, the reduction rate may be set to further reduce the image or to shift the coordinates of the cut-out region in accordance with the position of the object recognized in the reduced entire image.

In step S110, the setting in step S105 is reflected in the process of the captured images in the subsequent cycles. Further, the main processor 24 which executes the processing in the step S105 is preferably different from the main processor 24 which executes the processing in the step S109. As a result, the processing in the step S105 and the processing in the step S109 can be executed in parallel.

<Schematic of Image Processing System (Comparative Example)>

Figure 8:
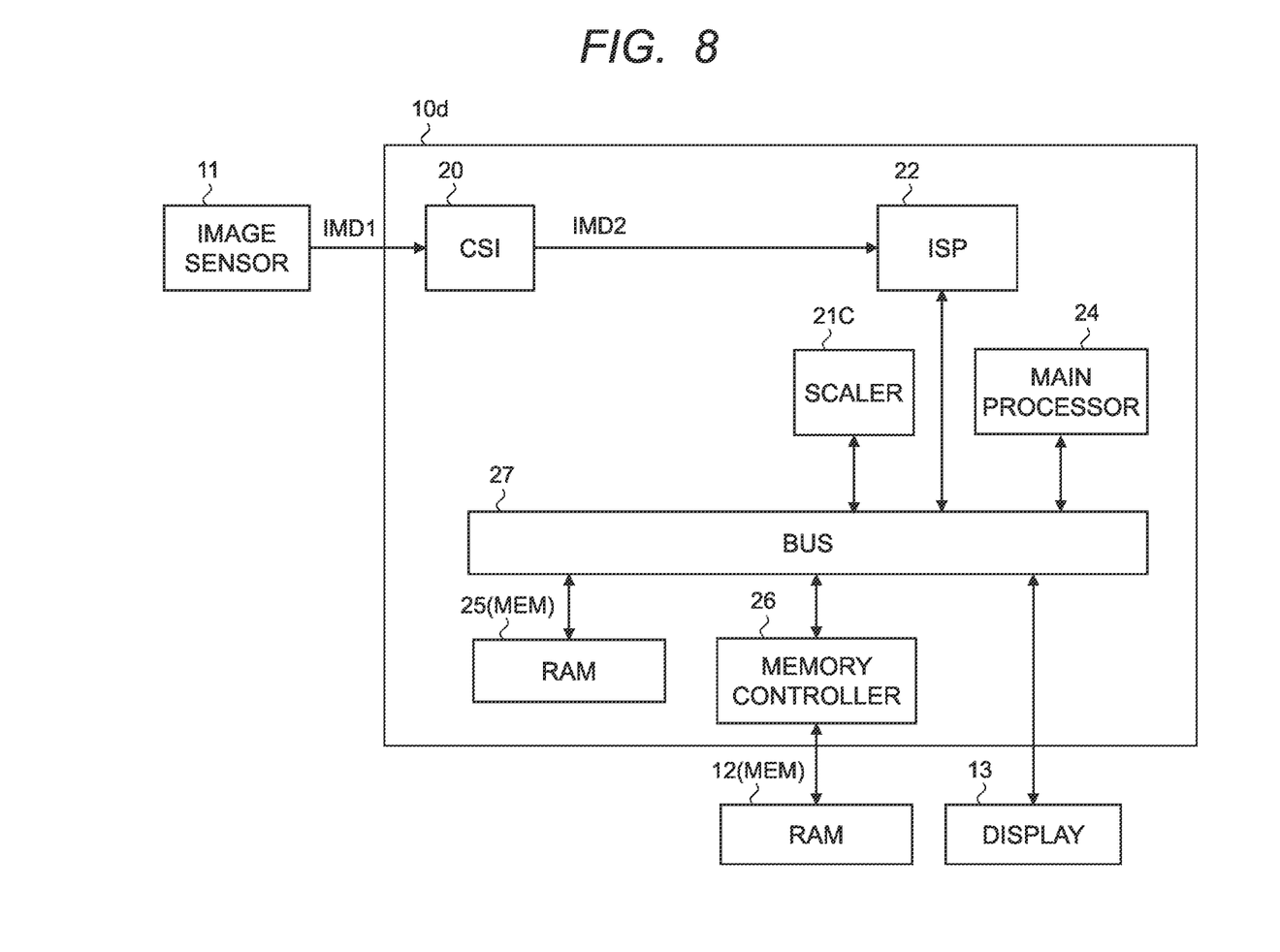
FIG. 8 is a schematic diagram showing a configuration example of an image processing system as a comparative example.
Figure 9:
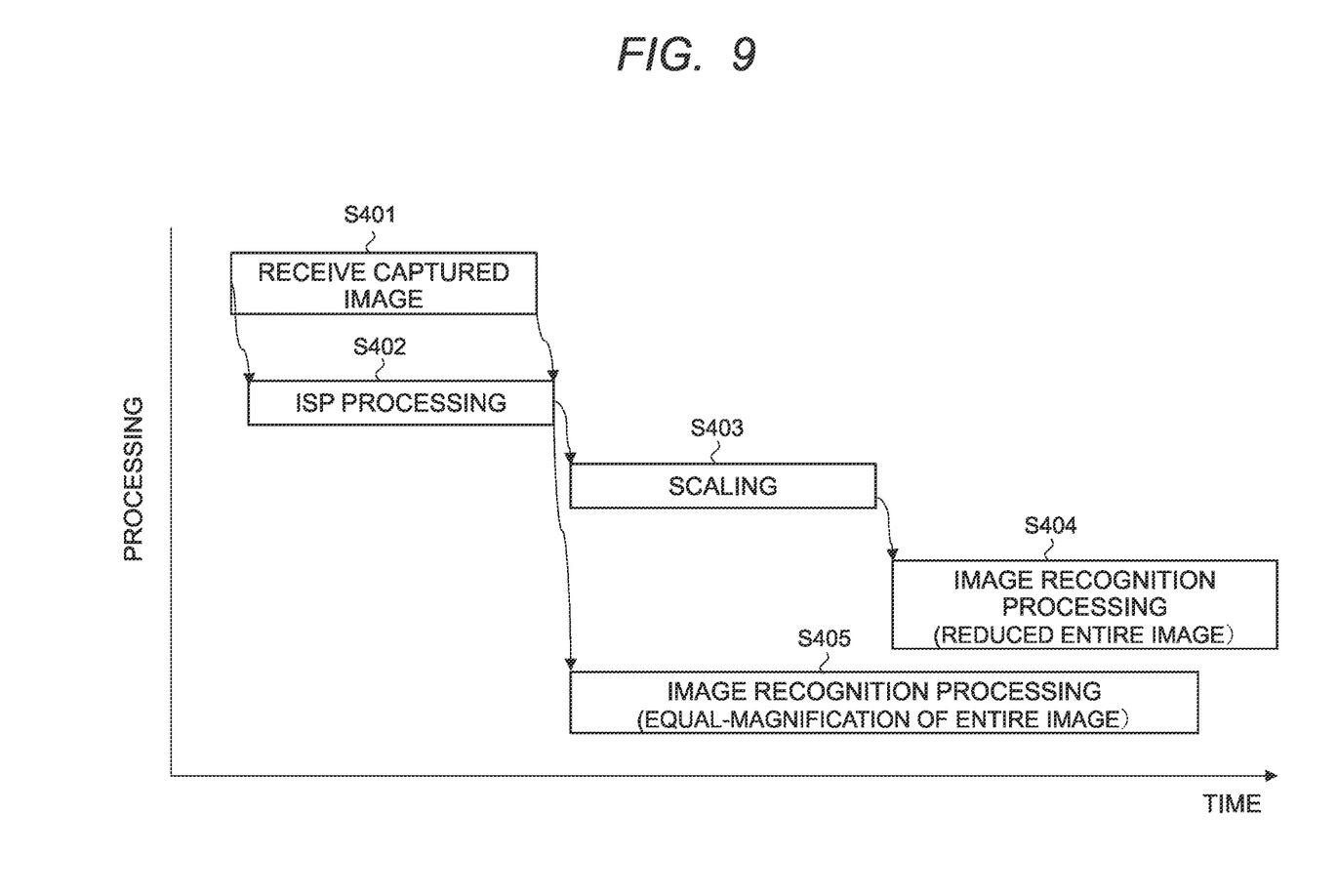
FIG. 9 is a timing chart showing an operation example of the main part of the image processing system of FIG. 8.

FIG. 8 is a schematic diagram showing a configuration example of an image processing system as a comparative example. FIG. 9 is a timing chart showing an operation example of the main part of the image processing system of FIG. 8. The image processing system shown in FIG. 8 differs from the configuration example of FIG. 1 in the configuration of the semiconductor device 10d. In the semiconductor device 10d, unlike the semiconductor device 10a of FIG. 1, the scaler 21a and the ROI controller 23 are not provided, and the scaler 21c is provided instead of the scaler 21a. The scaler 21c is connected to bus 27 but not to the CSI 20.

In FIG. 9, the CSI 20 receives the captured image from the image sensor 11 (step S401). In step S402, the image signal processor 22 executes ISP processing on the captured image received in step S401, and stores the captured image after the ISP processing, that is, the equal-magnification image of the entire image in the memory MEM. Hereinafter, the equal-magnification image of the entire image is referred as the equal-magnification entire image.

The scaler 21c generates a reduced entire image by reducing the equal-magnification entire image stored in the memory MEM at the step S402, and stores it in the memory MEM (step S403). The main processor 24 then executes image recognition processing on the reduced entire image after the ISP processing stored in the memory MEM in step S403 (step S404). The main processor 24 also executes image recognition processing on the equal-magnification entire image after the ISP processing stored in the memory MEM at the step S402 (step S405).

When such a configuration and operation are used, the captured image represented by the image data IMD2 in FIG. 2, that is, the equal-magnification entire image, is substantially stored in the memory MEM in accordance with the ISP processing in the step S402. Further, in accordance with the reduction process in the step S403, the memory MEM substantially stores the reduced entire image represented by the image data IMDs in FIG. 2. Then, the image recognition processing is executed on the equal-magnification entire image and the reduced entire image stored in the memory MEM.

Therefore, the size of the image data stored in the memory MEM may increase. In particular, as a precondition of the reduction process in the step S403, it is necessary to store in the memory MEM the equal-magnification entire image after the ISP process in advance. Further, although not shown in the figure, even when ROI processing is executed, assuming that the equal-magnification entire image after ISP processing is stored in the memory MEM in advance, it is necessary to execute processing such that a part of the data of the equal-magnification entire image is extracted from the data area of the equal-magnification entire image using a DMAC (Direct Memory Access Controller) or the like.

Main Effects of First Embodiment

When the method of the first embodiment is used, high-accuracy image recognition can be realized while reducing the size of the image data stored in the memory MEM. In particular, such effects can be obtained by providing the scaler 21a and the ROI controller 23 in the next stage of the CSI 20.

More specifically, with reference to FIG. 3, the memory MEM stores the reduced entire image represented by the image data IMDs in FIG. 2 in accordance with the ISP processing after reduction processing in the step S102, S103. Further, the memory MEM stores the ROI equal-magnification image represented by the image data IMDr in FIG. 2 in accordance with the ISP processing after the ROI processing in the step S106, S107. That is, unlike the case of FIGS. 8 and 9, since the memory MEM does not need to store the equal-magnification entire image represented by the image data IMD2 in FIG. 2, the size of the image data stored in the memory MEM can be reduced.

However, in general, if the size of the image data to be stored in the memory MEM is reduced, the accuracy of the image recognition executed on the image data may be reduced. In the first embodiment, the ROI controller 23 generates the ROI equal-magnification image, whereby the accuracy of image recognition can be ensured. In this case, unlike the case of FIGS. 8 and 9, instead of executing ROI processing on the image stored in the memory MEM after the ISP processing, the ISP processing is executed on the image stored in the memory MEM after the ROI processing. Therefore, it is not necessary to store the equal-magnification entire image in the memory MEM.

The main processor 24 executes image recognition processing on the reduced entire image and the ROI equal-magnification image stored in the memory MEM. At this time, as shown in FIG. 2, the size of the ROI equal-magnification image is ¼ or the like of the equal-magnification entire image. Therefore, compared with the case of the step S405 of FIG. 9, the processing time associated with the image recognition can be reduced, thereby reducing the processing load and power consumption.

Second Embodiment

<Schematic of Image Processing System>

Figure 4:
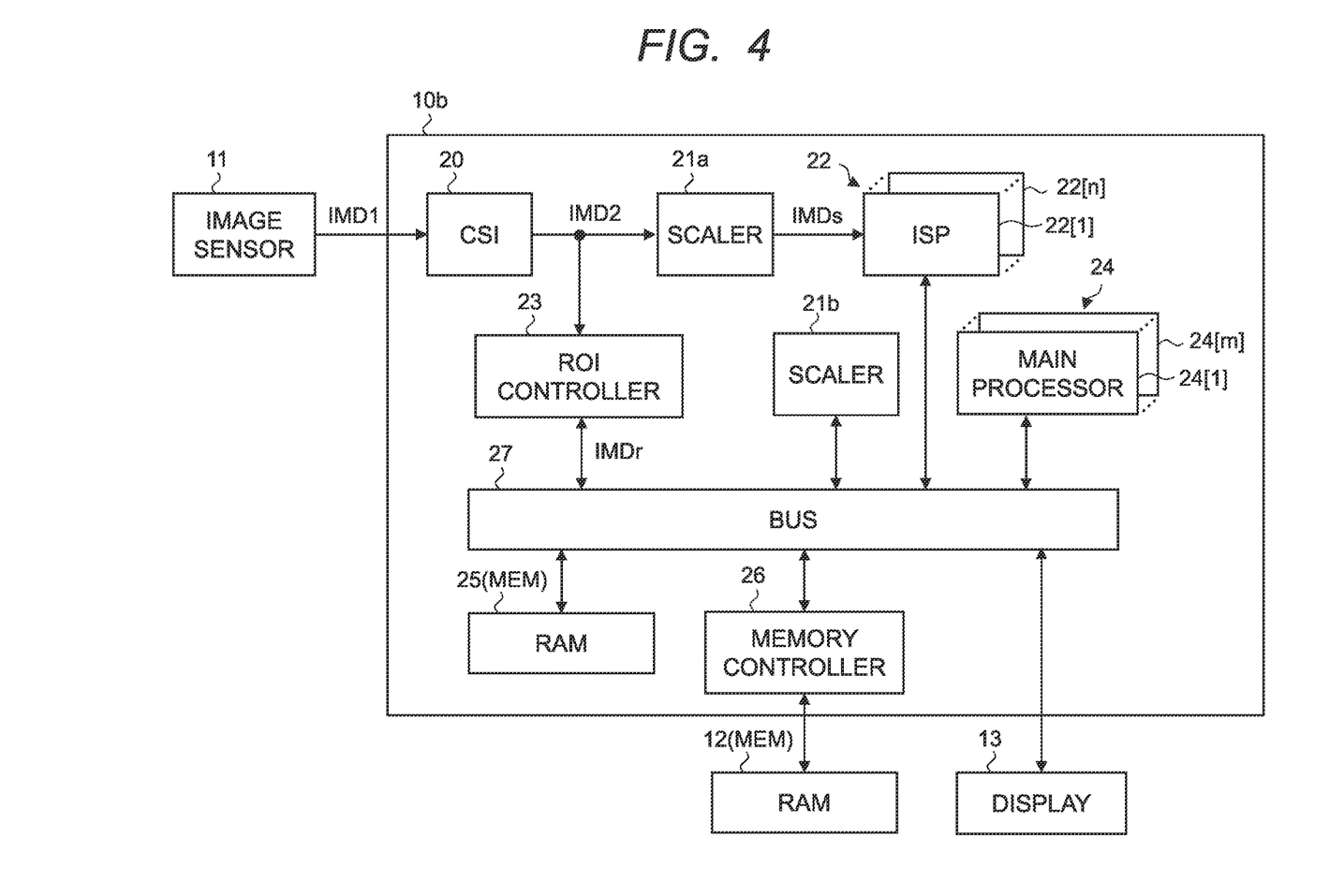
FIG. 4 is a schematic diagram showing a configuration example of an image processing system according to second embodiment.

FIG. 4 is a schematic diagram showing a configuration example of an image processing system according to second embodiment. The image processing system shown in FIG. 4 differs from the configuration example of FIG. 1 in the configuration of the semiconductor device 10b. The semiconductor device 10b, as compared with the semiconductor device 10a of FIG. 1, furthermore includes a scaler (second scaler) 21b. Like the scaler 21c shown in FIG. 8, the scaler 21b is connected to the bus 27, but is not connected to the CSI 20.

However, the scaler 21b is different from the scaler 21c shown in FIG. 8 in the image to be processed. That is, the scaler 21b reduces the ROI image (ROI equal-magnification image) after the ISP processing is executed, and in detail, the ROI equal-magnification image stored in the memory MEM, rather than the equal-magnification entire image. Then, the scaler 21b generates the reduced ROI image and stores it in the memory MEM. The circuit configuration of the scaler 21b may be the same as that of the scaler 21a.

<Detailed Operation of Image Processing System>

Figure 5:
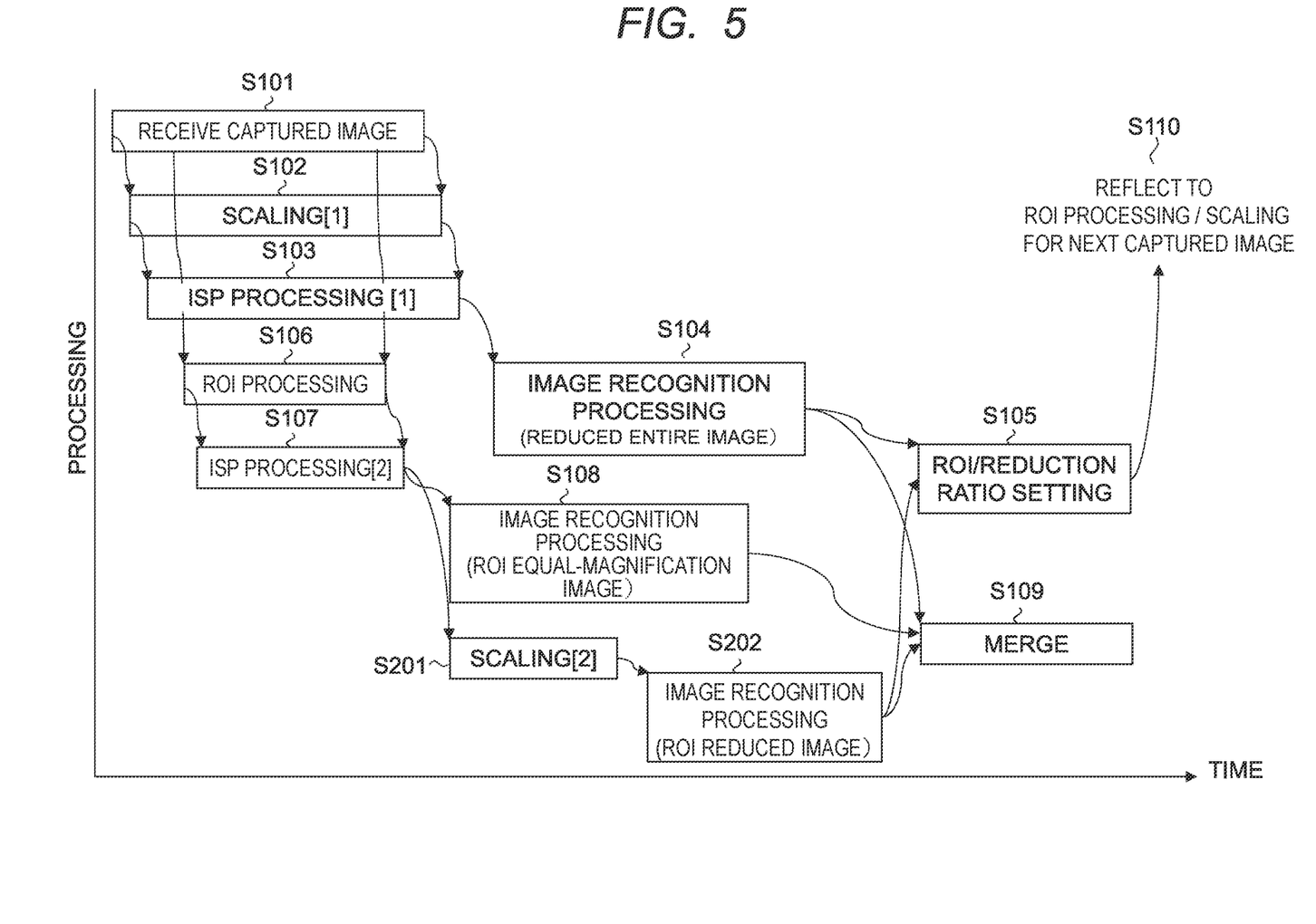
FIG. 5 is a timing chart showing an operation example of the main part of the image processing system of FIG. 4.

FIG. 5 is a timing chart showing an operation example of the main part of the image processing system of FIG. 4. In the timing chart of FIG. 5, compared with the timing chart of FIG. 3, the processing of the steps S201, S202 are added. Assuming that, in the step S107, the image signal processor 22 executes ISP processing on the ROI equal-magnification image. Then, in the step S201, the scaler 21b generates a reduced ROI image by reducing the ROI equal-magnification image after the ISP processing in the step S107, and stores the reduced ROI image in the memory MEM.

Subsequently, in step S202, the main processor 24 executes image recognition processing on the reduced ROI image generated in step S201 and stored in the memory MEM. The result of executing the image recognition processing in the step S202 is appropriately reflected in the merge processing of the image recognition results in the step S109 or the setting process of the cut-out region/reduction ratio in the step S105. Note that the image recognition processing for the ROI equal-magnification image in the step S108 and the image recognition processing for the reduced ROI image in the step S202 may be selectively executed as appropriate in accordance with the situation of the vehicle or the like.

The main processor 24 executing image recognition processing at the step S202 may be, for example, a third main processor 24[3] that differs from the first and second main processors 24 [1], 24 [2] executing each image recognition processing at the step S104, S108. Thus, each main processor 24 can execute the processing in parallel.

Main Effects of Second Embodiment

As described above, by using the method of the second embodiment, the same effects as the various effects described in the first embodiment can be obtained. Further, unlike the method of the first embodiment, existing software may be effectively utilized in some cases. That is, in image recognition processing, software that executes image recognition processing on a reduced ROI image may generally be used. The reduced ROI image at this time is generated using, for example, the configuration of FIG. 8. Specifically, the reduced ROI image is generated by executing ROI processing using a DMAC or the like on the reduced entire image generated in the step S404 of FIG. 9 and stored in the memory MEM.

By using the method of the second embodiment, different from the method of the first embodiment, it is possible to operate software targeted for such an reduced ROI image. Also, as shown in the timing chart of FIG. 5, it is possible to operate such software without extending the overall processing time.

Third Embodiment

<Schematic of Image Processing System>

Figure 6:
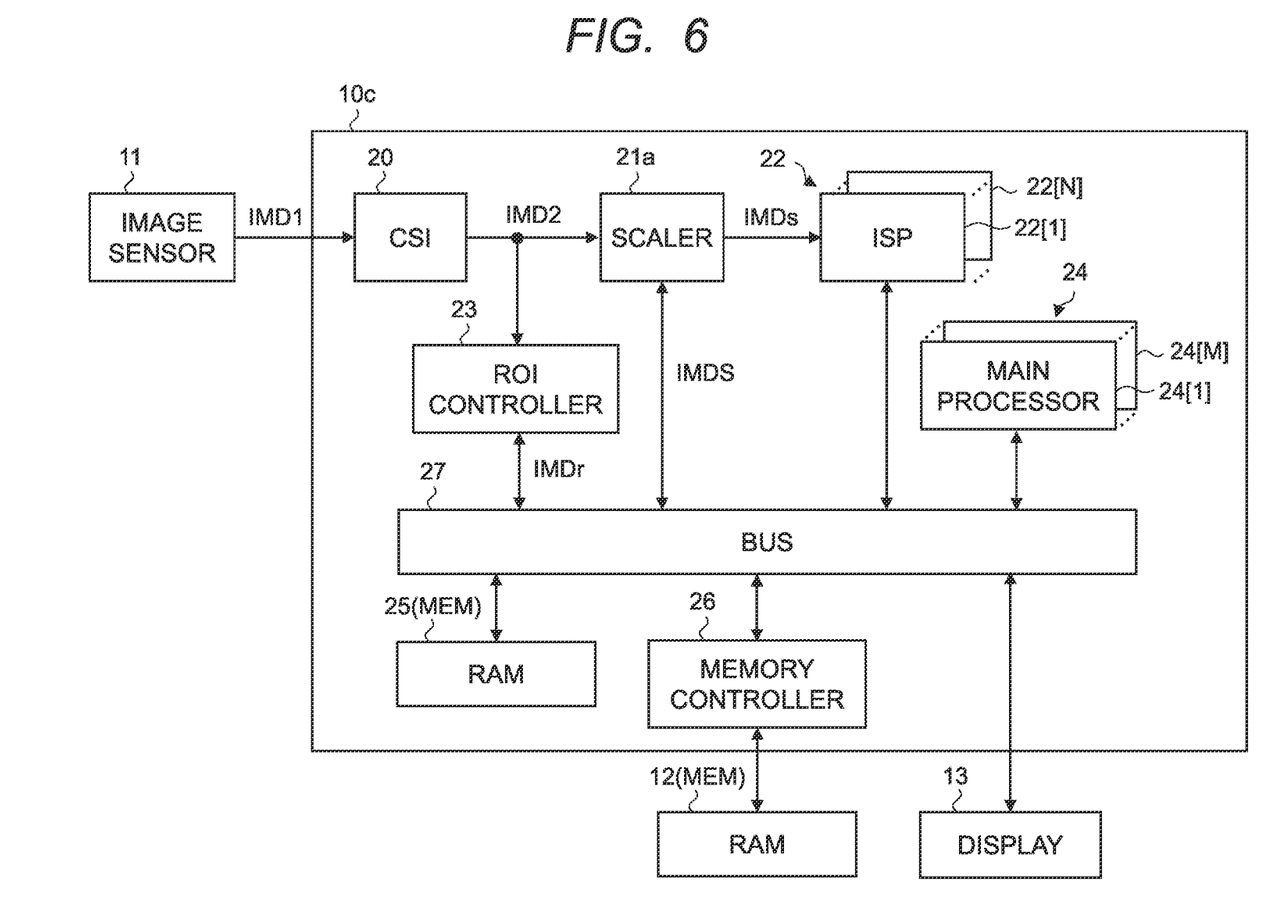
FIG. 6 is a schematic diagram showing a configuration example of an image processing system according to third embodiment.

FIG. 6 is a schematic diagram showing a configuration example of an image processing system according to third embodiment. The image processing system shown in FIG. 6, as compared with the configuration example of FIG. 1, the configuration of the semiconductor device 10c is different. The semiconductor device 10c, as compared with the semiconductor device 10a of FIG. 1, the connection from the scaler 21a to the bus 27 is added. Consequently, the scaler 21a outputs the generated image data IMDs, or the reduced entire image, to the image signal processor 22 and stores it in the memory MEM through the bus 27.

The image signal processor 22 executes ISP processing on the reduced entire image directly input from the scaler 21a as in the first embodiment. The ISP processing at this time is, for example, a process customized for image recognition. By the ISP processing, for example, image data in YUV format or the like represented by luminance and color difference is generated.

In addition, the image signal processor 22 executes the ISP processing required for displaying on the display 13 on the reduced entire image stored in the memory MEM by the scaler 21a. By the ISP processing, for example, image data in an RGB format or the like represented by pixel values of R (red), G (green), and B (blue) is generated. In the ISP processing, for example, distortion correction processing or the like corresponding to the characteristics of the display 13 may be executed.

<Detailed Operation of Image Processing System>

Figure 7:
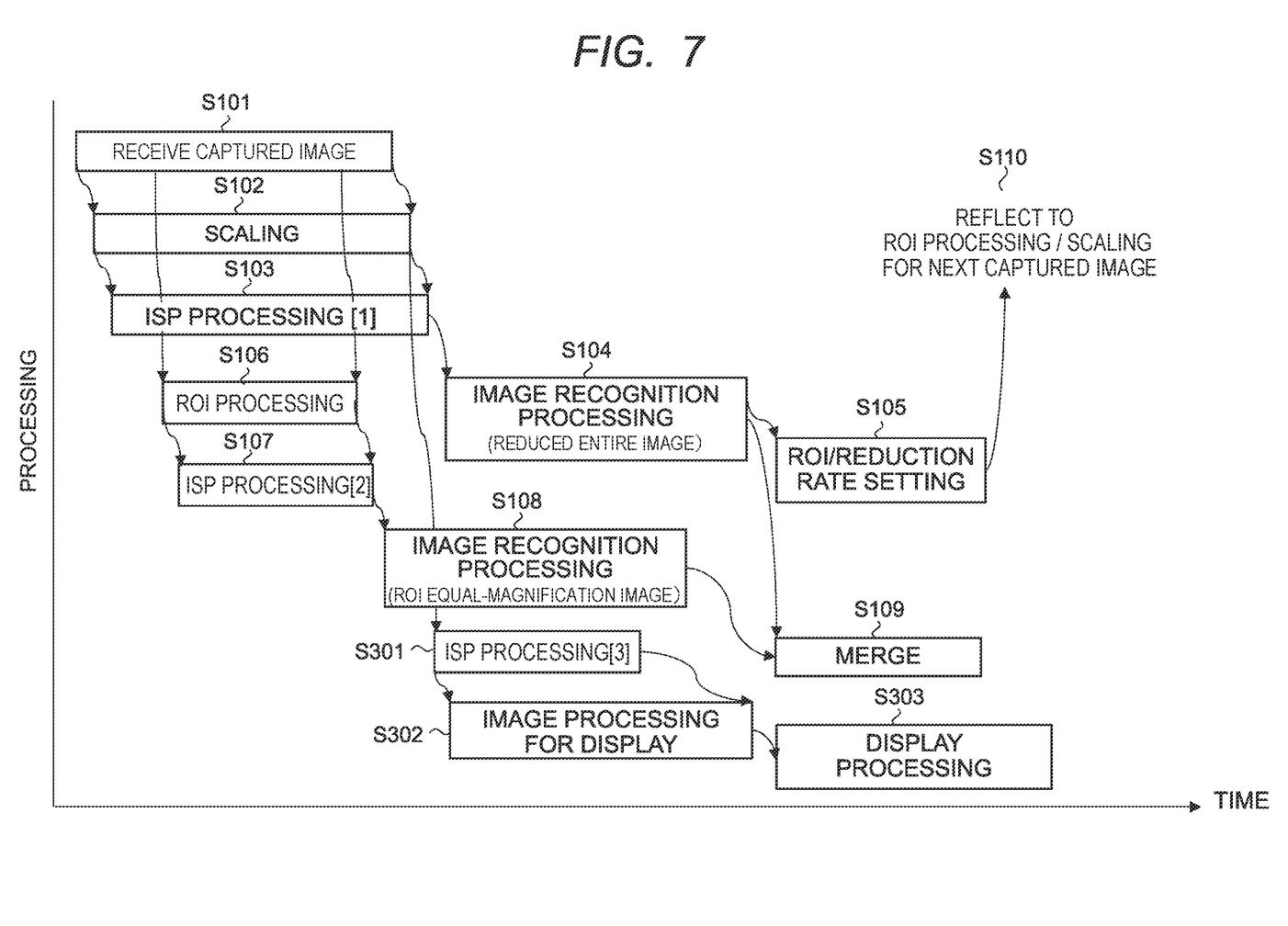
FIG. 7 is a timing chart showing an operation example of the main part of the image processing system of FIG. 6.

FIG. 7 is a timing chart showing an operation example of the main part of the image processing system of FIG. 6. In the timing chart of FIG. 7, compared with the timing chart of FIG. 3, a process in step S301 to step S303 is added. Assuming that, in the step S102, the scaler 21a generates an image data IMDs, that is, a reduced entire image, and stores the reduced entire image in the memory MEM.

Then, in step S301, the image signal processor 22 generates a display image by executing the ISP processing required for displaying on the display 13 on the reduced entire image stored in the memory MEM in step S102. The image signal processor 22 stores the generated display image in the memory MEM.

The image signal processor 22 executing the ISP processing in step S301 may be the first or second image signal processor 22[1], 22[2] after executing the ISP processing in step S103 or step S107. As a result, the utilization efficiency of the image signal processor 22 can be increased. However, of course, a third image signal processor 22[3] different from the first or second image signal processor 22[1], 22[2] may be used.

Further, in FIG. 7, in parallel with the ISP processing in the step S301, the main processor 24 executes the image processing on the display image stored in the memory MEM (step S302). The image processing includes, for example, processing for synthesizing information such as AR (Augmented Reality) information and the like with a display image. The main processor 24 outputs the image data of the display image after the image processing to the display 13 based on a predetermined display format. Thus, the display image 13 is displayed on the display 13 in step S303.

The main processor 24 which executes image processing at the step S302 may be, for example, a third main processor 24[3] different from the first and second main processors 24 [1], 24 [2] which execute image recognition processing at the step S104,S108. Thus, each main processor 24 can execute the processing in parallel.

Main Effects of Third Embodiment

As described above, by using the method of third embodiment, the same effects as the various effects described in first embodiment can be obtained. Furthermore, as shown in the timing chart of FIG. 7, display on the display 13 can be executed without extending the overall processing time.

Although the invention made by the present inventor has been specifically described based on the embodiment, the present invention is not limited to the embodiment described above, and it is needless to say that various modifications can be made without departing from the gist thereof.

For example, the semiconductor device 10a of FIG. 1 has a configuration for processing the captured image from one image sensor 11, of course, may be configured to process a plurality of captured images from a plurality of image sensors in parallel. In this case, the semiconductor device may include a plurality of scalers 21a and ROI controllers 23 in addition to the image signal processor 22 and the main processor 24.

What is claimed is:

1. A semiconductor device comprising:
a scaler circuit configured to reduce an image captured by an image sensor to generate a reduced entire image of the captured image;
a region of interest (ROI) controller circuit configured to cut out a partial region of the captured image to generate an ROI image; and
an image signal processor configured to i) execute image processing on the reduced entire image and the ROI image, and ii) store the reduced entire image and the ROI image both of which the image processing is performed to, wherein the image processing includes demosaic processing, wherein the semiconductor device further includes a main processor configured to execute first image recognition processing on the reduced entire image after executing the image processing by the image signal processor, and a second image recognition processing on the ROI image after the image processing by the image signal processor is executed, and wherein, based on a first image recognition result of the reduced entire image and a second image recognition result of the ROI image, the main processor is configured to set, to a subsequent image captured by the image sensor, the partial region used by the ROI controller circuit or set a reduction rate used by the scaler circuit.

2. The semiconductor device according to claim 1, wherein the image signal processor includes a first image signal processor and a second image signal processor, wherein the first image signal processor is configured to execute the image processing on the reduced entire image which is generated by the scaler circuit, and wherein the second image signal processor is configured to execute the image processing on the ROI image in parallel with the image processing by the first image signal processor.

3. The semiconductor device according to claim 2, wherein the scaler circuit stores the generated reduced entire image to a memory, and wherein the first image signal processor or the second image signal processor executes an image processing required to display on the reduced entire image stored in the memory by the scaler circuit after executing the image processing on the reduced entire image or the ROI image.

4. The semiconductor device according to claim 1, wherein the main processor includes a first main processor and a second main processor, wherein the first main processor executes the first image recognition processing, and wherein the second main processor executes the second image recognition processing in parallel with the first image recognition processing by the first main processor.

5. The semiconductor device according to claim 1, wherein the scaler circuit is a first scaler circuit, and wherein the semiconductor device further comprises a second scaler circuit configured to generate a reduced ROI image by reducing the ROI image after the image processing by the image signal processor.

6. The semiconductor device according to claim 1, wherein the semiconductor device is an in-vehicle semiconductor chip.

7. An image processing system, comprising:

an image sensor configured to capture an image of an object to generate a captured image;

a semiconductor device; and a memory, wherein the semiconductor device comprises:

a scaler circuit configured to generate a reduced entire image by reducing the capture image from the image sensor;

a region of interest (ROI) controller circuit configured to generate a ROI image by cutting out a partial region of the captured image; and an image signal processor configured to i) execute image processing on the reduced entire image and the ROI image, and ii) store the reduced entire image and the ROI image both of which the image processing is performed to, wherein the image processing includes demosaic processing, wherein the semiconductor device further includes a main processor configured to execute a first image recognition processing on the reduced entire image after executing the image processing by the image signal processor and to execute a second image recognition processing on the ROI image after executing the image processing by the image signal processor, and wherein, based on a first image recognition result of the reduced entire image and a second image recognition result of the ROI image, the main processor is configured to set, to a subsequent image captured by the image sensor, the partial region used by the ROI controller circuit or set a reduction rate used by the scaler circuit.

8. The image processing system according to claim 7, wherein the image signal processor includes a first image signal processor and a second image processor, wherein the first image signal processor is configured to execute the image processing on the reduced entire image which is generated by the scaler circuit, and wherein the second image signal processor is configured to execute the image processing on the ROI image in parallel with the image processing by the first image signal processor.

9. The image processing system according to claim 8, further comprising a display, wherein the scaler circuit is configured to store the generated reduced entire image to the memory, and wherein the first image signal processor or the second image signal processor is configured to execute an image processing required to displaying on the display on the reduced entire image which is stored in the memory by the scaler circuit after executing the image processing on the reduced entire image or the ROI image.

10. The image processing system according to claim 7, wherein the main processor includes a first main processor and a second main processor, wherein the first main processor is configured to execute the first image processing, and wherein the second main processor is configured to execute the second image processing in parallel with the first image processing by the first main processor.

* * * * *